(12) United States Patent
Onggosanusi et al.

(10) Patent No.: US 8,270,518 B2
(45) Date of Patent: Sep. 18, 2012

(54) HIGHER ORDER MULTIPLE INPUT, MULTIPLE OUTPUT EXTENSION

(75) Inventors: Eko N. Onggosanusi, Allen, TX (US); Badri N. Varadarajan, Dallas, TX (US); Runhua Chen, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 664 days.

(21) Appl. No.: 12/497,111

(22) Filed: Jul. 2, 2009

(65) Prior Publication Data

US 2010/0002790 A1    Jan. 7, 2010

Related U.S. Application Data

(60) Provisional application No. 61/078,231, filed on Jul. 3, 2008.

(51) Int. Cl.
*H04B 7/02* (2006.01)
*H04L 1/02* (2006.01)

(52) U.S. Cl. ...................................................... 375/267

(58) Field of Classification Search .................. 375/260, 375/261, 262, 267, 295, 316, 340, 341, 239, 375/259; 370/310, 328, 329, 342
See application file for complete search history.

(56) References Cited

U.S. PATENT DOCUMENTS

| | | | |
|---|---|---|---|
| 2009/0122857 A1* | 5/2009 | Li et al. ....................... | 375/239 |
| 2010/0195594 A1* | 8/2010 | Seo et al. ..................... | 370/329 |
| 2010/0304691 A1* | 12/2010 | Goransson et al. ............ | 455/69 |
| 2011/0019764 A1* | 1/2011 | Chung et al. .................. | 375/295 |
| 2011/0085507 A1* | 4/2011 | Jongren ........................ | 370/329 |
| 2011/0122819 A1* | 5/2011 | Jongren et al. ............... | 370/328 |

* cited by examiner

*Primary Examiner* — David C. Payne
*Assistant Examiner* — Syed Haider
(74) *Attorney, Agent, or Firm* — Robert D. Marshall, Jr.; Wade James Brady, III; Frederick J. Telecky, Jr.

(57) ABSTRACT

A method of multiple input multiple output downlink communications including mapping complex-valued modulation symbols onto one or more transmission layers by mapping complex-valued modulation symbols onto the layers and preceding the complex-valued modulation block of vectors and generating a block of vectors mapped onto at least four antenna ports. A first embodiment employs a maximum of two layers per codeword. A second embodiment employs no more than two codewords.

4 Claims, 5 Drawing Sheets

HIGHER ORDER MULTIPLE INPUT, MULTIPLE OUTPUT EXTENSION

CLAIM OF PRIORITY

This application claims priority under 35 U.S.C. 119(e)(1) to U.S. Provisional Application No. 61/078,231 filed Jul. 3, 2008.

TECHNICAL FIELD OF THE INVENTION

The technical field of this invention is wireless communication.

BACKGROUND OF THE INVENTION

The current Evolved Universal Terrestrial Radio Access (E-UTRA) Long Term Evolution (LTE) Rel. 8 specification supports up to 4-layer spatial multiplexing. As the enhancement for LTE is coming due to the IMT-Advanced call-of-proposal for yet another generation of upgrade in cellular technology. Thus the various aspects of LTE need to be reevaluated and improved. Of a particular interest is to increase the downlink (DL) peak data rate by a factor of 2 and an increase in the DL spectral efficiency to meet the IMT-Advanced requirements. Since LTE Rel. 8 already supports 64 Quadrature Amplitude Modulation (QAM) and higher-order modulation is infeasible in terms of the error vector magnitude (EVM) requirements, the support of higher-order spatial multiplexing (up to 8 layers) is inevitable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UE's data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

FIG. 2 illustrates the overall process of downlink communication of the prior art. FIG. 2 illustrates only two input codewords according to the prior art. The baseband signal representing a downlink physical channel is produced by the following steps. Each input codeword to be transmitted on a physical channel has its bits scrambled by respective scrambling circuits 201 and 202. Corresponding modulators 202 and 212 modulate the scrambled bits generating complex-valued modulation symbols. A single layer mapper 203 maps the complex-valued modulation symbols onto one or more transmission layers. Complex-valued modulation symbols $d^{(q)}(0), \ldots, d^{(q)}(M_{symb}^{(q)}-1)$ for code word q are mapped onto the layers $x(i)=[x^{(0)}(i) \ldots x^{(v-1)}(i)]^T$, $i=0, 1, \ldots, M_{symb}^{layer}-1$ where v is the number of layers and $M_{symb}^{layer}$ is the number of modulation symbols per layer. Single preceding circuit 204 precodes the complex-valued modulation symbols on each layer for transmission on the antenna ports. Precoder circuit 204 input a block of vectors $x(i)=[x^{(0)}(i) \ldots x^{(v-1)}(i)]^T$, $i=0, 1, \ldots, M_{symb}^{layer}-1$ from layer mapper 203 and generates a block of vectors $y(i)=[\ldots y^{(p)}(i) \ldots]^T$, $i=0, 1, \ldots, M_{symb}^{ap}-1$ to be mapped onto resources on each of the antenna ports, where $y^{(p)}(i)$ represents the signal for antenna port p. Corresponding resource channel mappers 205 and 215 map the complex-valued modulation symbols for each antenna port to resource elements. Corresponding OFDM signal generation circuits 206 and 216 generate complex-valued time-domain the Orthogonal Frequency Division Multiplexing (OFDM) signal for each antenna port.

The most crucial matter in extending the maximum number of layers from 4 to 8 is the extension of the codeword-to-layer mapping or simply termed layer mapping. The extension needs to be backward compatible with LTE Rel. 8 and introduce minimum impact on the current LTE specification especially in terms of control signaling. FIG. 3 illustrates the current layer mapping for two transmitting antennas (2-TX) and for four transmitting antennas (4-TX). For case 311 with one layer and two transmitting antennas, a single codeword CW1 is supplied to preceding for transmission via two antennas. For case 312 with one layer and four transmitting antennas, a single codeword CW1 is supplied to preceding for transmission via four antennas. For case 321 with two layers and two transmitting antennas, two codewords CW1 and CW2 are supplied to preceding for transmission via two antennas. For case 322 with two layers and four transmitting antennas, two codewords CW1 and CW2 are supplied to preceding for transmission via four antennas. For case 323 with two layers and four transmitting antennas, one codeword CW1 is supplied to a serial to parallel (S/P) converter which splits it into two signals and further supplies preceding for transmission via four antennas. As noted in FIG. 3 this case occurs only for retransmission using one codeword when the initial transmission used more that one codeword. For case 332 with three layers and four transmitting antennas, one codeword CW1 is supplied to preceding directly. The second codeword CW2 is supplied to preceding via an S/P converter which splits it into two signals for supply to preceding. In case 332 preceding drives four antennas. For case 342 with four layers and four transmitting antennas, codewords CW1 and CW2 supplies respective S/P converters which each split into two signals and further supply preceding for transmission via four antennas.

SUMMARY OF THE INVENTION

A method of multiple input multiple output downlink communications including mapping complex-valued modulation symbols onto one or more transmission layers by mapping complex-valued modulation symbols onto the layers and preceding the complex-valued modulation block of vectors and generating a block of vectors mapped onto at least four antenna ports. A first embodiment employs a maximum of two layers per codeword. A second embodiment employs no more than two codewords.

BRIEF DESCRIPTION OF THE DRAWINGS

These and other aspects of this invention are illustrated in the drawings, in which.

DETAILED DESCRIPTION OF PREFERRED EMBODIMENTS

This invention includes two alternatives embodiments. In the first alternative the maximum number of layers per codeword is 2. This results in 1 to 4 additional codeword(s) when the number of transmission layers is greater than 4. In the second alternative the maximum number of codewords is 2. Thus a maximum number of layers per codeword of 3 and 4 need to be supported when the number of transmission layers is greater than 4.

Figure 1:
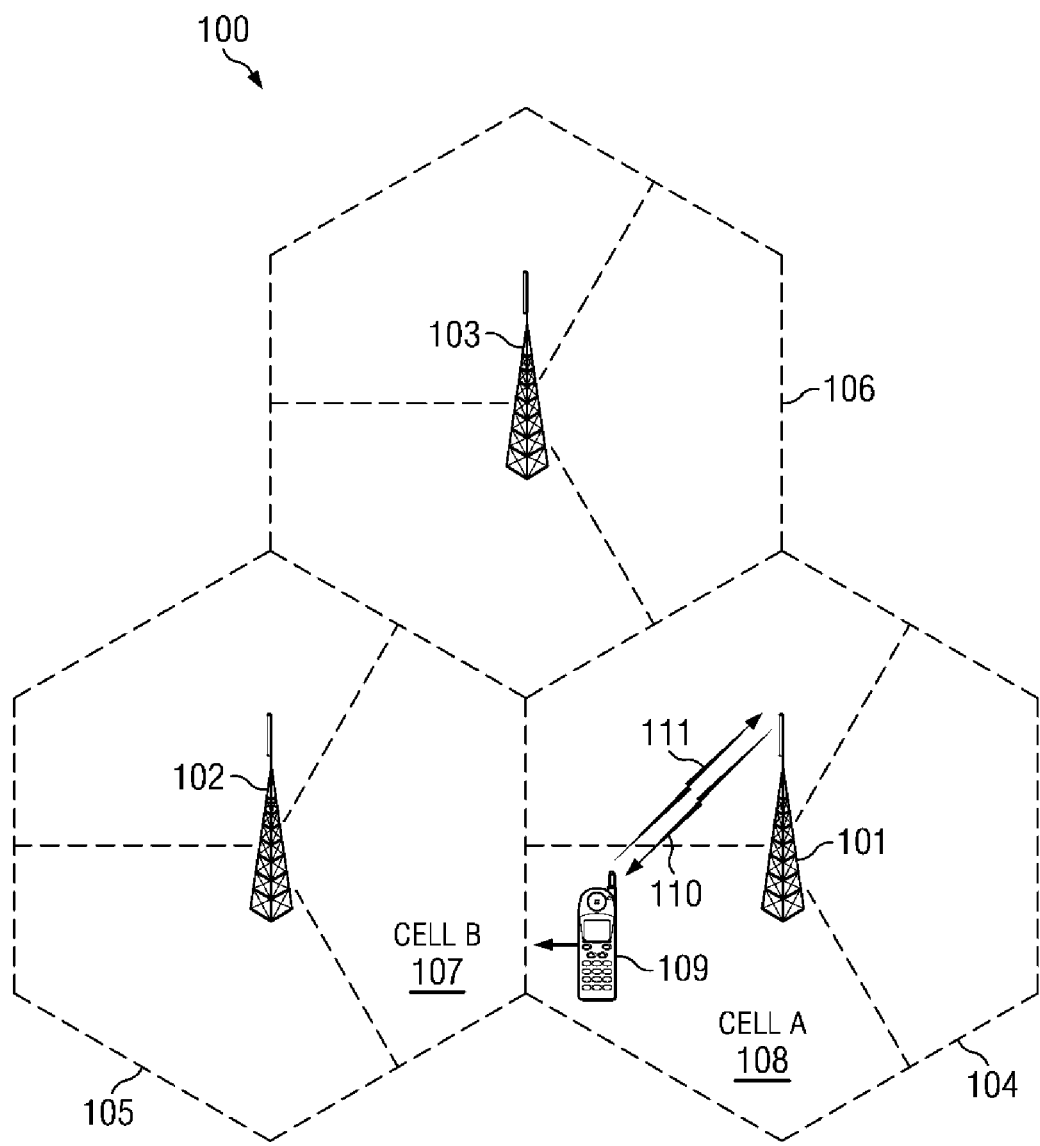
FIG. 1 is a diagram of a communication system of the prior art related to this invention having three cells.
Figure 2:
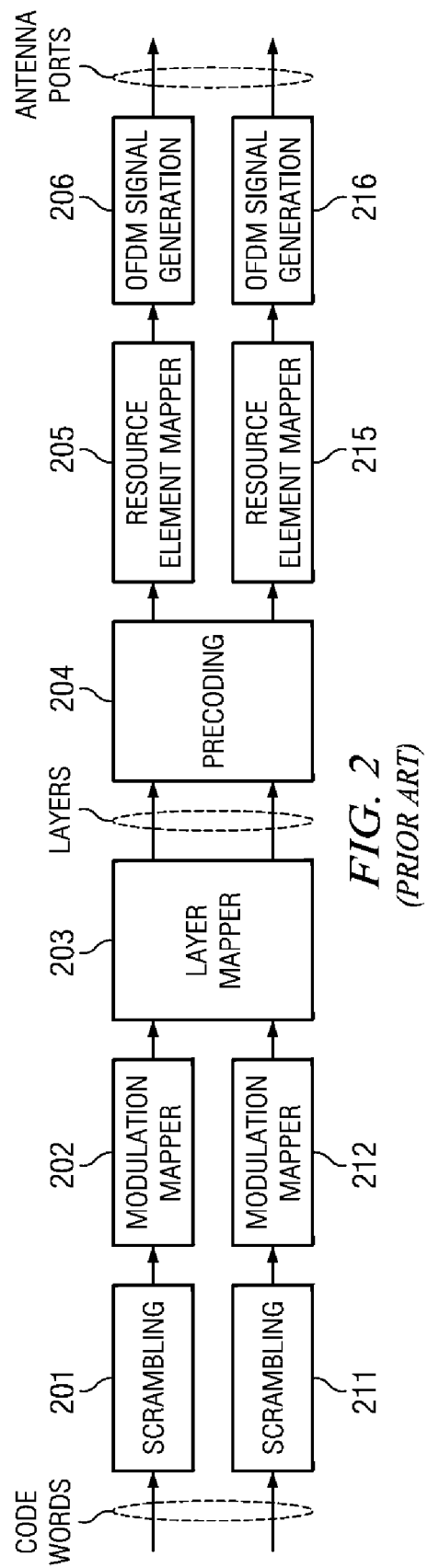
FIG. 2 illustrates the overall process of downlink communication of the current art.
Figure 3:
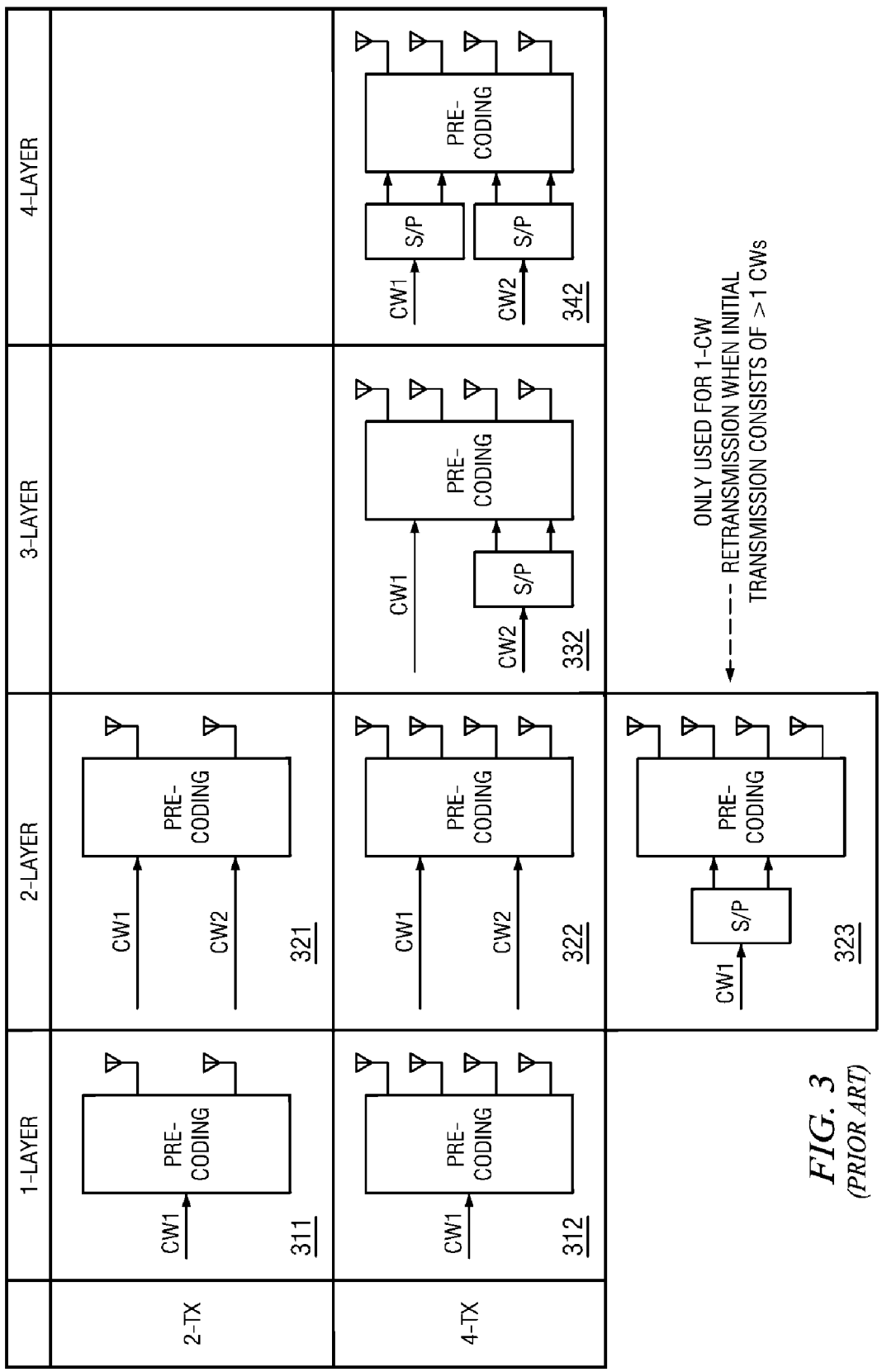
FIG. 3 illustrates the layer mapping of the current art.
Figure 4:
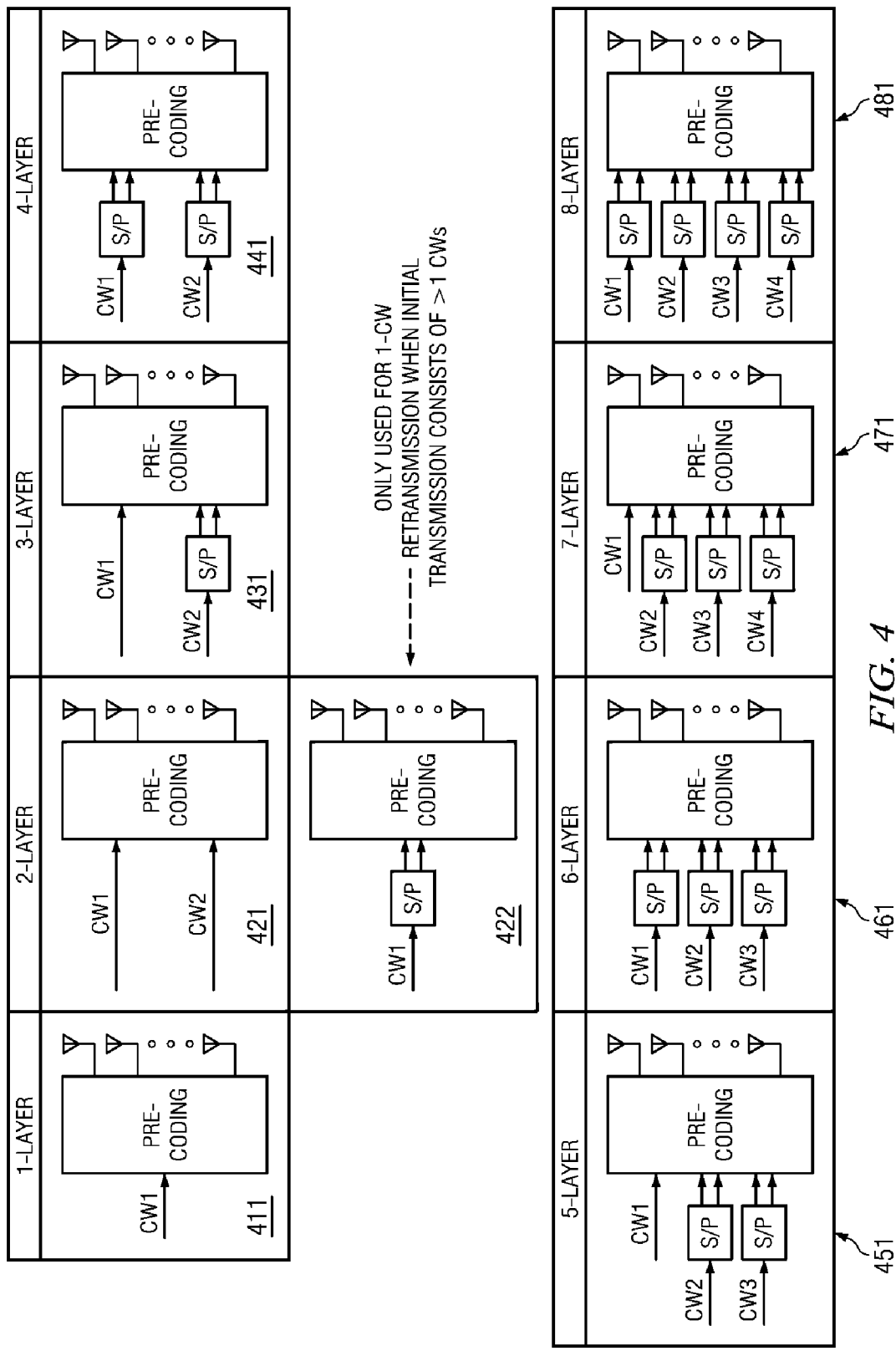
FIG. 4 illustrates the layer mapping of a first alternative embodiment of this invention.

FIG. 4 illustrates the first alternative embodiment having a maximum of 2 layers per codeword. FIG. 4 assumes more than four transmitting antennas. For case 411 with one layer, a single codeword CW1 is supplied to precoding for transmission via the plural antennas. For case 421 with two layers, two codewords CW1 and CW2 are supplied to precoding for transmission via the plural antennas. For case 422 with two layers, one codeword CW1 is supplied to an S/P converter which splits it into two signals and further supplies precoding for transmission via four antennas. As noted in FIG. 4 this case occurs only for retransmission using one codeword when the initial transmission used more that one codeword. For case 431 with three layers, one codeword CW1 is supplied to precoding directly. The second codeword CW2 is supplied to precoding via an S/P converter which splits it into two signals. In case 431 precoding drives the plural antennas. For case 441 with four layers, codewords CW1 and CW2 supplies respective S/P converters which split each into two signals and further supplies precoding for transmission via the plural antennas. For case 451 with five layers, one codeword CW1 supplies precoding directly. Two codewords CW2 and CW3 supply precoding via respective S/P converters which split them into two signals. Precoding supplies the plural antennas. For case 461 with six layers, three codewords CW1, CW2 and CW3 supply respective S/P converters which split each into two signals and further supplies precoding to drive the plural antennas. For case 471 with seven layers, one codeword CW1 supplies precoding directly. Three codewords CW2, CW3 and CW4 supply precoding via respective S/P converters which split each into two signals and further supplies precoding. Precoding supplies the plural antennas. For case 481 with eight layers, four codewords CW1, CW2, CW3 and CW4 supply respective S/P converters which split them into two signals and further supplies precoding to drive the plural antennas. Cases 411, 421, 422, 431 and 441 correspond substantially to respective prior art cases 312, 322, 323, 332 and 342 illustrated in FIG. 3. Cases 451, 461, 471 and 481 are entirely new.

With multi-codeword transmission, a successive interference cancellation (SIC) receiver can attain a near-capacity performance. The SIC receiver can also attain the Shannon capacity, but the associated channel quality indicator (CQI) definition is also easy to obtain. This is unlike the maximum likelihood (ML) type receiver or maximum aposteriori probability (MAP) type receiver. Hence, we may be motivated to keep the maximum number of layers per codeword to 2 and increase the number of codewords such that $$N_{CW} = \left\lceil \frac{N_{layer}}{2} \right\rceil,$$

where $N_{CW}$ is the number of codewords, $N_{layer}$ is the number of layers and [X] is the greatest integer in X.

The first codeword (CW1) is designated as the codeword with the minimum number of codewords. That is: $N_{layer}^{CW1}=2-\text{mod}(N_{layer}, 2)$, $N_{layer}^{CWn}=2$ for n>1. Alternatively, the last codeword can be designated as the codeword with the minimum number of codewords. The maximum codeword size is thus twice the codeword size as 1-layer transmission.

Three control signals may be required to support codeword to layer mapping: channel quality indicator report indicating supportable modulation and coding schemes (MCS) for each codeword; downlink control signaling to signal the actual MCS used; and an acknowledge/not acknowledge (ACK/NAK) signal for each codeword. The following alternatives are possible for each of these control signals. The first alternative provides one signal per codeword. This results in four signals for an 8-layer transmission. While this is a possible embodiment, it is preferred for backward compatibility with prior art UL and DL control signaling since it requires some new UL control formats and higher DL control overhead for the new DCI formats. The prior art system only supports up to 2 signals. The second alternative includes a maximum of two signals irrespective of the number of codewords. The $N_{CW}$ codewords are bundled into 2 effective codewords for the purpose of signaling. As an example, for 5-layer and 6-layer transmission, CW1 and CW2 are bundled into 1 signal such as one ACK/NAK signal or Hybrid Automatic Repeat Request (HARQ) process number, or CQI report, or MCS for both these codewords, while CW3 is assigned to the second HARQ process. For 7-layer and 8-layer transmission, CW1 and CW2 are bundled into 1 signal while CW3 and CW4 are bundled into the second signal.

It must be noted that different strategies might be adopted for different control signals. For example, the CQI report and DL signaling might be done separately for each codeword while the ACK/NAK signals are bundled together. This invention includes all combinations of signaling schemes for different signals along the lines mentioned above.

Figure 5:
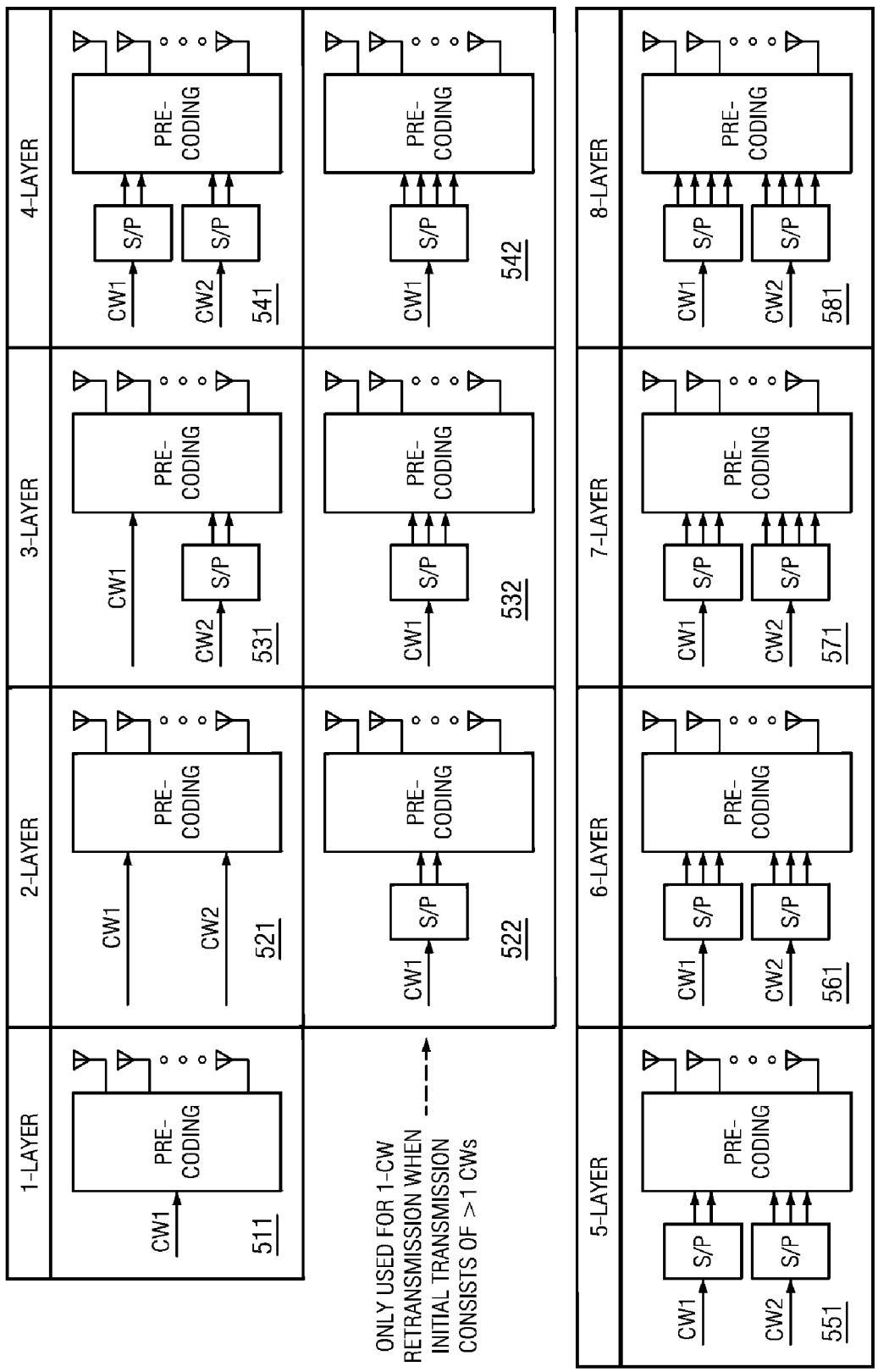
FIG. 5 illustrates the layer mapping of a second alternative embodiment of this invention.

FIG. 5 illustrates the second alternative embodiment having a maximum of 2 codewords. FIG. 5 assumes more than four transmitting antennas. For case 511 with one layer, a single codeword CW1 is supplied to precoding for transmission via the plural antennas. For case 521 with two layers, two codewords CW1 and CW2 are supplied to precoding for transmission via the plural antennas. For case 522 with two layers, one codeword CW1 is supplied to an S/P converter which splits it into two signals and further supplies precoding for transmission via four antennas. As noted in FIG. 5 this case occurs only for retransmission using one codeword when the initial transmission used more that one codeword. For case 531 with three layers, one codeword CW1 is supplied to precoding directly. The second codeword CW2 is supplied to precoding via an S/P converter which splits it into two signals. In case 531 precoding drives the plural antennas. For case 532 with three layers, one codeword CW1 is supplied to an S/P converter which splits it into three signals and further supplies pre-decoding to drive the plural antennas. As noted in FIG. 5 this case occurs only for retransmission using one codeword when the initial transmission used more that one codeword. For case 541 with four layers, codewords CW1 and CW2 supplies respective S/P converters which split each into two signals and further supplies precoding for transmission via the plural antennas. For case 542 with four layers, a single codeword CW1 supplies an S/P converter which splits it into four signals and further supplies precoding for transmission via the plural antennas. As noted in FIG. 5 this case occurs only for retransmission using one codeword when the initial transmission used more that one codeword. For case 551 with five layers, one codeword CW1 supplies a first S/P converter which splits it into two signals and further supplies precoding. A second codeword CW2 supplies a second S/P converter which splits it into three signals and further supplies precoding. Precoding supplies the plural antennas. For case 661 with six layers, a first codeword CW1 supplies a first S/P converter which splits it into three signals and further supplies precoding. A second codeword CW2 supplies a second S/P converter which splits it into three signals and further supplies precoding. Precoding supplies the plural antennas. For case 571 with seven layers, a first codeword CW1 supplies a first S/P converter which splits it into three parts and further supplies precoding. A second codeword CW2 supplies a second S/P converter which splits it into four parts and further supplies precoding. Precoding supplies the plural antennas. For case 581 with eight layers, two codewords CW1 and CW2 supply respective S/P converters which split each into four parts and further supplies precoding to drive the plural antennas. Cases 511, 521, 522, 531 and 541 correspond substantially to respective prior art cases 312, 322, 323, 332 and 342 illustrated in FIG. 3. Cases 542, 551, 561, 571 and 581 are entirely new.

This alternative preserves maximum backward compatibility of the UL and DL control signaling with the prior art illustrated in FIG. 3. With a maximum number of codewords of two, there is no need for additional number of HARQ processes nor additional number of UL ACK/NAK bits per process. While the SIC receiver gain is limited to two iterations, the loss can be compensated by applying ML type detection for each of the two SIC receiver iterations.

The first codeword (CW1) is designated as the codeword with the minimum number of codewords. That is:

$$N_{layer}^{CW1} = \left\lfloor \frac{N_{layer}}{2} \right\rfloor, N_{layer}^{CW2} = N_{layer} - N_{layer}^{CW1} = \left\lceil \frac{N_{layer}}{2} \right\rceil.$$

Alternatively, the last codeword can be designated as the codeword with the minimum number of codewords.

Consequently, the maximum codeword size is two, three or four times codeword size for 1-layer transmission, depending on the number of layers. Related to HARQ, two additional layer mappings for retransmission purposes may be needed for 3-layer and 4-layer retransmissions. These are cases 532 and 542. Cases 532 and 542 are only used for retransmitting one out of the 2 codewords if only one of the two codewords fails to be decoded. This is analogous to the need for defining a 1-CW 2-layer mapping for the 2-layer retransmission of case 323 illustrated in FIG. 3.

The same considerations mentioned for first alternative hold here regarding control signaling.

What is claimed is:

1. A method of multiple input multiple output downlink communications comprising:

mapping complex-valued modulation symbols onto one or more transmission layers by mapping complex-valued modulation symbols $d^{(q)}(0), \ldots, d^{(q)}(M_{symb}^{(q)}-1)$ for code word q onto the layers $x(i)=[x^{(0)}(i) \ldots x^{(v-1)}(i)]^T$, $i=0,1,\ldots,M_{symb}^{layer}-1$ where v is the number of layers and $M_{symb}^{layer}$ is the number of modulation symbols per layer, with a maximum of two layers per codeword;

precoding the complex-valued modulation block of vectors $x(i)=[x^{(0)}(i) \ldots x^{(v-1)}(i)]^T$, $i=0,1,\ldots,M_{symb}^{layer}-1$ and generating a block of vectors $y(i)=[\ldots y^{(p)}(i) \ldots]^T$, $i=0,1,\ldots,M_{symb}^{ap}-1$ mapped onto at least four antenna ports;

for five layers supplying the complex-valued modulation block of vectors of a first codeword directly to precoding, splitting the complex-valued modulation block of vectors of a second codeword into two parts for supply to precoding, and splitting the complex-valued modulation block of vectors of a third codeword into two parts for supply to precoding.

2. A method of multiple input multiple output downlink communications comprising:

mapping complex-valued modulation symbols onto one or more transmission layers by mapping complex-valued modulation symbols $d^{(q)}(0), \ldots, d^{(q)}(M_{symb}^{(q)}-1)$ for code word q onto the layers $x(i)=[x^{(0)}(i) \ldots x^{(v-1)}(i)]^T$, $i=0,1,\ldots,M_{symb}^{layer}-1)$ where v is the number of layers and $M_{symb}^{layer}$ is the number of modulation symbols per layer, with a maximum of two layers per codeword;

precoding the complex-valued modulation block of vectors $x(i)=[x^{(0)}(i) \ldots x^{(v-1)}(i)]^T$, $i=0,1,\ldots,M_{symb}^{layer}-1$ and generating a block of vectors $y(i)=[\ldots y^{(p)}(i) \ldots]^T$, $i=0,1,\ldots,M_{symb}^{ap}-1$ mapped onto at least four antenna ports; and for six layers splitting the complex-valued modulation block of vectors of a first codeword into two parts for supply to precoding, splitting the complex-valued modulation block of vectors of a second codeword into two parts for supply to precoding, and splitting the complex-valued modulation block of vectors of a third codeword into two parts for supply to precoding.

3. A method of multiple input multiple output downlink communications comprising:

mapping complex-valued modulation symbols onto one or more transmission layers by mapping complex-valued modulation symbols) $d^{(q)}(0), \ldots, d^{(q)}(M_{symb}^{(q)}-1)$ for code word q onto the layers $x(i)=[x^{(0)}(i) \ldots x^{(v-1)}(i)]^T$, $i=0,1,\ldots,(M_{symb}^{layer}-1)$ where v is the number of layers and $M_{symb}^{layer}$ is the number of modulation symbols per layer, with a maximum of two layers per codeword;

precoding the complex-valued modulation block of vectors $x(i)=[x^{(0)}(i) \ldots x^{(v-1)}(i)]^T$, $i=0, 1, \ldots, M_{symb}^{layer}-1$ and generating a block of vectors $y(i)=[\ldots y^{(p)}(i) \ldots]^T$, $i=0, 1, \ldots, M_{symb}^{ap}-1$ mapped onto at least four antenna ports; and for seven layers
- supplying the complex-valued modulation block of vectors of a first codeword directly to precoding,
- splitting the complex-valued modulation block of vectors of a second codeword into two parts for supply to precoding,
- splitting the complex-valued modulation block of vectors of a third codeword into two parts for supply to precoding, and
- splitting the complex-valued modulation block of vectors of a fourth codeword into two parts for supply to precoding.

4. A method of multiple input multiple output downlink communications comprising:

mapping complex-valued modulation symbols onto one or more transmission layers by mapping complex-valued modulation symbols $d^{(q)}(0), \ldots, d^{(q)}(M_{symb}^{(q)}-1)$ for code word q onto the layers $x(i)=[x^{(0)}(i) \ldots x^{(v-1)}(i)]^T$, $i=0, 1, \ldots, M_{symb}^{layer}-1$ where v is the number of layers and $M_{symb}^{layer}$ is the number of modulation symbols per layer, with a maximum of two layers per codeword;

precoding the complex-valued modulation block of vectors $x(i)=[x^{(0)}(i) \ldots x^{(v-1)}(i)]^T$, $i=0, 1, \ldots, M_{symb}^{layer}-1$ and generating a block of vectors $y(i)=[\ldots y^{(p)}(i) \ldots]^T$, $i=0, 1, \ldots, M_{symb}^{ap}-1$ mapped onto at least four antenna ports; and for eight layers
- splitting the complex-valued modulation block of vectors of a first codeword into two parts for supply to precoding,
- splitting the complex-valued modulation block of vectors of a second codeword into two parts for supply to precoding,
- splitting the complex-valued modulation block of vectors of a third codeword into two parts for supply to precoding, and
- splitting the complex-valued modulation block of vectors of a fourth codeword into two parts for supply to precoding.

* * * * *